(12) United States Patent
Yamaguchi

(10) Patent No.: US 9,669,687 B2
(45) Date of Patent: Jun. 6, 2017

(54) VEHICLE BODY STRUCTURE

(71) Applicant: HONDA MOTOR CO., LTD., Tokyo (JP)

(72) Inventor: Tomoki Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/918,958

(22) Filed: Oct. 21, 2015

(65) Prior Publication Data

US 2016/0114661 A1   Apr. 28, 2016

(30) Foreign Application Priority Data

Oct. 22, 2014   (JP) ................... 2014-215028

(51) Int. Cl.
| | |
|---|---|
| *B60J 5/10* | (2006.01) |
| *B60Q 1/30* | (2006.01) |
| *B60J 1/18* | (2006.01) |

(52) U.S. Cl.
CPC ............ *B60J 5/102* (2013.01); *B60J 1/18* (2013.01); *B60J 5/101* (2013.01); *B60J 5/104* (2013.01); *B60J 5/105* (2013.01); *B60Q 1/302* (2013.01)

(58) Field of Classification Search
CPC ... B60J 5/10; B60J 5/101; B60J 5/105; B60Q 1/2619; B60Q 1/30; B60Q 1/302; B62D 35/007
USPC ............... 296/50, 51, 56, 106, 146.2, 146.8
See application file for complete search history.

(56) References Cited

U.S. PATENT DOCUMENTS

| | | | |
|---|---|---|---|
| 6,123,384 A | 9/2000 | Eustache et al. | |
| 2002/0105202 A1* | 8/2002 | Ziv-Av | B60J 5/108 |
| | | | 296/56 |
| 2003/0116990 A1 | 6/2003 | Paiva et al. | |
| 2014/0152038 A1* | 6/2014 | Crane | B60S 1/0433 |
| | | | 296/56 |

FOREIGN PATENT DOCUMENTS

| | | | | |
|---|---|---|---|---|
| DE | 20 2006 013385 U1 | | 1/2008 | |
| DE | 102007056853 A1 | * | 5/2009 | ............ B60J 5/101 |
| DE | 10 2008 020 090 A1 | | 10/2009 | |
| EP | 1764247 A2 | * | 3/2007 | ............ B60J 5/104 |
| FR | EP 1386767 A1 | * | 2/2004 | ............... B60J 5/10 |

(Continued)

OTHER PUBLICATIONS

Office Action dated May 23, 2016, issued in counterpart Japanese Patent Application No. 2014-215028, with English translation. (5 pages).

(Continued)

*Primary Examiner* — Jason S Daniels
(74) *Attorney, Agent, or Firm* — Westerman, Hattori, Daniels & Adrian, LLP

(57) ABSTRACT

A vehicle body structure (10) including a tailgate opening (13) provided in a vehicle body rear part (12) and a tailgate (15) supported by the vehicle body rear part (12) for opening/closing the tailgate opening (13) is disclosed. The tailgate (15) includes a tailgate body (26) supported by the vehicle body rear part (12), a door opening (31) formed in the tailgate body (26), a sub-door (35) supported by the tailgate body (26) for opening/closing the door opening (31), and a high-mount stop lamp (39) disposed so as to avoid the sub-door (35).

5 Claims, 10 Drawing Sheets

(56) References Cited

FOREIGN PATENT DOCUMENTS

| | | |
|---|---|---|
| JP | 1-150119 U | 10/1989 |
| JP | 02-23215 U | 2/1990 |
| JP | 05-041919 U | 6/1993 |
| JP | 2008-037174 A | 2/2008 |
| JP | 2010-184592 A | 8/2010 |
| JP | 2014-012448 A | 1/2014 |
| TR | EP 2386435 A1 * 11/2011 ............... B60J 5/101 |

OTHER PUBLICATIONS

Extended European Search Report dated Mar. 30, 2016, issued in counterpart Application No. 15190999.1. (8 pages).
Japanese Office Action dated Jan. 6, 2017, issued in counterpart Japanese Patent Application No. 2014-215028 with partial English translation.

* cited by examiner

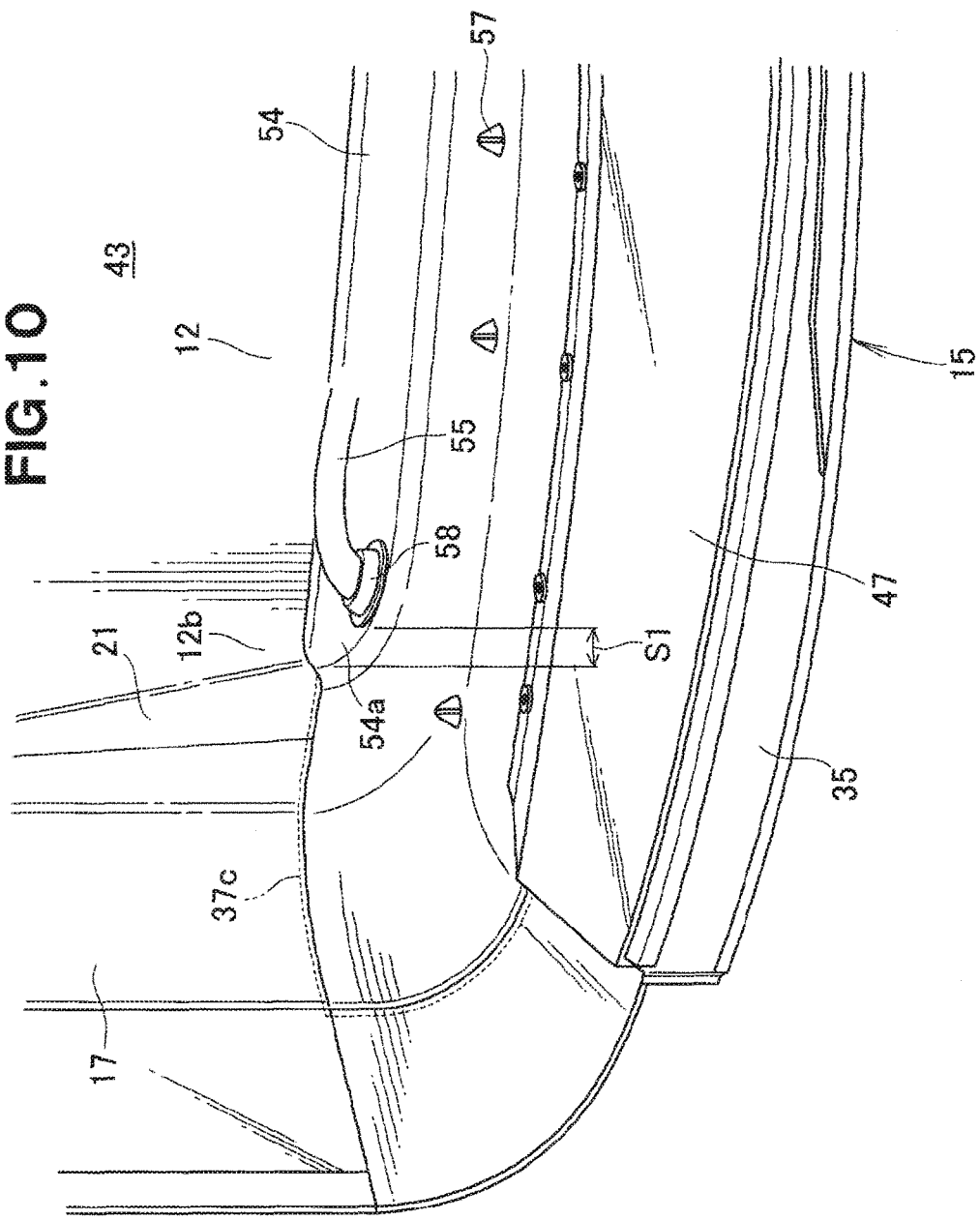

VEHICLE BODY STRUCTURE

TECHNICAL FIELD

The present invention relates to a vehicle body structure including an opening formed at a rear part of a vehicle body and a tailgate supported at the vehicle body rear part for opening/closing the opening.

BACKGROUND ART

Among know vehicle bodies, one includes a tailgate openably/closably disposed at a vehicle body rear part in such a manner as to occupy substantially the entire area of the vehicle body rear part, which tailgate is halved into left door and right doors occupying substantially the entire area of the tailgate. Thus, as the left and right doors closed, upper parts of the vehicle body rear part and the tailgate are covered by the left and right doors (see, e.g., DE 10 2008 090 090; hereinafter referred to as Patent. Literature 1).

In the vehicle body rear part structure of Patent Literature 1, the upper part of the vehicle body rear part is covered by the left and right doors. It is thus difficult to save an area in the vehicle body rear part and the tailgate for disposing a high-mount stop lamp (hereinafter referred to as "lighting device"), whereby the lighting device is required to be disposed on the left and right doors.

In this instance, however, it is necessary to make an electrical wire (linear member), such as a wire harness, extend from the vehicle body rear part to the left and right doors and then to the lighting device through the latter. By making the electrical wire pass through the left and right doors, the resulting construction becomes complex.

Further, when the lighting device is disposed on each of the left and right doors, the lighting devices separated and stay away from each other upon opening of the doors. This makes it difficult to see the lighting devices from behind the vehicle body.

SUMMARY OF THE INVENTION

It is therefore an object of the present invention to provide a vehicle body structure which is simple in construction and ensure visibility of a lighting device.

According to the present invention, there is provided a vehicle body structure having an opening formed in a vehicle body rear part and a tailgate supported by the vehicle body rear part for opening/closing the opening, wherein the tailgate comprises: a tailgate body supported by the vehicle body rear part; a door opening formed in the tailgate body; a sub-door supported by the tailgate body for opening/closing the door opening; and a lighting device disposed to avoid the sub-door.

In the present invention, the lighting device is disposed on the tailgate. Thus, it is not necessary for the electrical wire such as the harness leading to the lighting device to pass through the sub-door before eventual connection to the lighting device, whereby the harness can be disposed to run from the tailgate directly to the lighting device. Further, since it is not necessary for the sub-door to be configured to allow passage of the harness therethrough, the sub-door is rendered simple in construction. Additionally, since the lighting device is disposed on the tailgate, the lighting device will not move together with the sub-door when the sub-door is opened. Consequently, it is possible to see the lighting device from behind the vehicle body even when the sub-door is opened, whereby desired visibility of the lighting device is secured.

It is preferable that the tailgate have an upper end positioned above an upper end of the sub-door and the lighting device be disposed vertically between the upper end of the tailgate and the upper end of the sub-door. With this arrangement, it becomes possible prevent the lighting device from being hidden by the sub-door irrespective of the degree of opening of the sub-door. As a result, the lighting device can be seen from behind the vehicle body as the sub-door is opened, whereby the desired visibility of the lighting device is secured. Further, provision of the lighting device between the upper end of the tailgate and the upper end of the sub-door enables disposition of the lighting device at a relatively high position. Thus, the lighting device stays at the high position even when a vehicle passenger is standing outside the vehicle. Consequently, there is no fear of the lighting device being hidden by the passenger, whereby the desired visibility of the lighting device is secured.

In a preferred form, one of opposite edges of the sub-door is pivotally supported by the tailgate such that the one edge overlaps with the lighting device in a vehicle width direction. Thus, with the sub-door opened, it is possible to make the left side part of the lighting device confront the left side of the sub-door and to make the right side part of the lighting device confront the right side of the sub-door. Stated otherwise, it is possible not to hide the lighting device wholly by the opened sub-door. As a result, the light side part and the left side part of the lighting device can be seen even when, for example, a passenger shorter than the height of the lighting device is present on the left and right sides of the sub-door, whereby the desired visibility of the lighting device is secured.

Assume that the lighting device is positioned on the sub-door. Then, the lighting device overlaps with one of the opposite edges of the sub-door, whereby the lighting device is required to be divided. To this end, the lighting device is disposed on the tailgate to thereby free the lighting device from the need to be divided. This renders the lighting device simple in construction and enables positioning of the lighting device at a laterally desired position, thereby increasing the freedom of designing thereof.

Preferably, a spoiler separate from the tailgate is provided on the vehicle body rear part rearward of the tailgate and the lighting device is disposed on the spoiler. Provision of the separate spoiler to the tailgate rearward of the vehicle body enables keeping deformation of the tailgate to a minimum by absorbing with the spoiler a load applied to the vehicle body rear part from behind. Thus, only the spoiler damaged by the load needs to be repaired, thus rendering the repair work easy and efficient.

In a preferred form, the tailgate is provided with the sub-door as well as a washer nozzle for spraying a washing liquid onto the tailgate. Provision of the washer nozzle to the tailgate makes it unnecessary to arrange a tubular member for feeding a washing liquid to the washer nozzle to run through the sub-door, thus rendering the sub-door simple in construction.

It is preferable that the vehicle body structure further comprises: a first window glass pane provided on a vehicle exterior side of the sub-door; and a second window glass pane provided on that part of is vehicle exterior side of the tailgate which avoid the sub-door, the first window glass pane and the second window glass pane being disposed to be flush with each other.

In light of the external aesthetic appearance and visibility of the vehicle body, it is desirable that the outer surface of the tailgate be laid flush with the outer surface of the sub-door. However, to make the outer surface of the tailgate lie flush with the outer surface of the sub-door, it is necessary to lengthen the distance between a front end part and a rear end part of the tailgate body (specifically, a tailgate upper part) (namely, a thickness dimension of the tailgate). Thus, the amount of draw of the front panel and the rear panel of the tailgate upper part upon draw-forming of the frames of the tailgate upper part becomes large, whereby firming of the front panel and the rear panel becomes difficult. Thus, the tailgate window glass pane is provided on that side of the tailgate which faces the vehicle exterior and is arranged to lie flush with the door window glass pane. As a result, the amount of draw of the front panel and the rear panel can be kept smaller by a thickness dimension of the tailgate window glass pane, whereby the front panel and the rear panel (and hence the tailgate body) is rendered easy to form.

BRIEF DESCRIPTION OF THE DRAWINGS

Certain preferred embodiment of the present invention will be described below with reference to the accompanying drawings, in which:

FIG. 10 is a perspective view illustrating the vehicle body structure of FIG. 1, as seen from a vehicle compartment lower side.

MODE FOR CARRYING OUT THE INVENTION

Description will be made now as to an embodiment of the present invention with reference to the accompanying drawings. Throughout the specification, the terms "front", "rear", "left" and "right" represent directions as seen from a vehicle driver.

Figure 1:
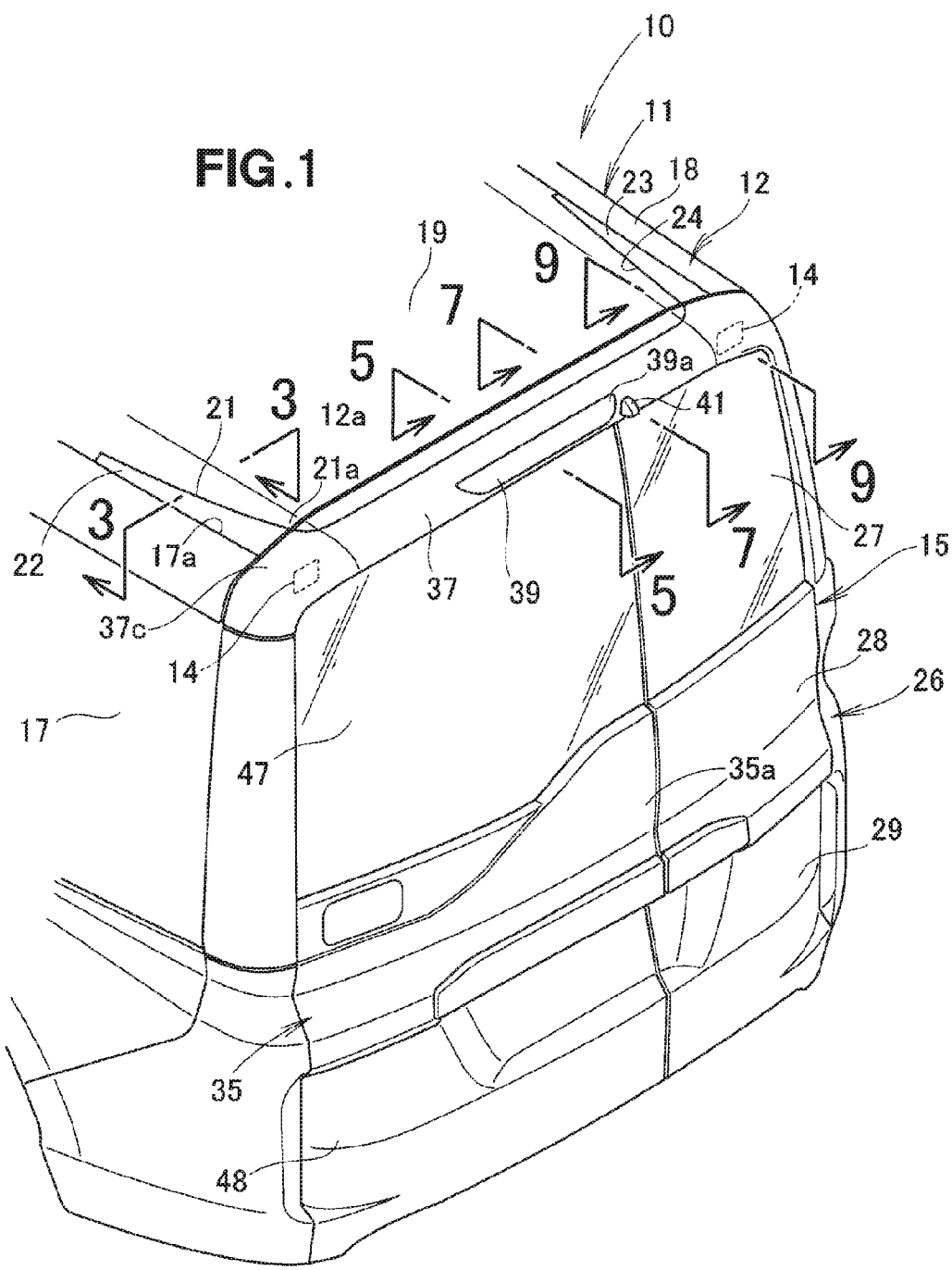
FIG. 1 is a perspective view illustrating vehicle body structure employing the present invention.
Figure 2:
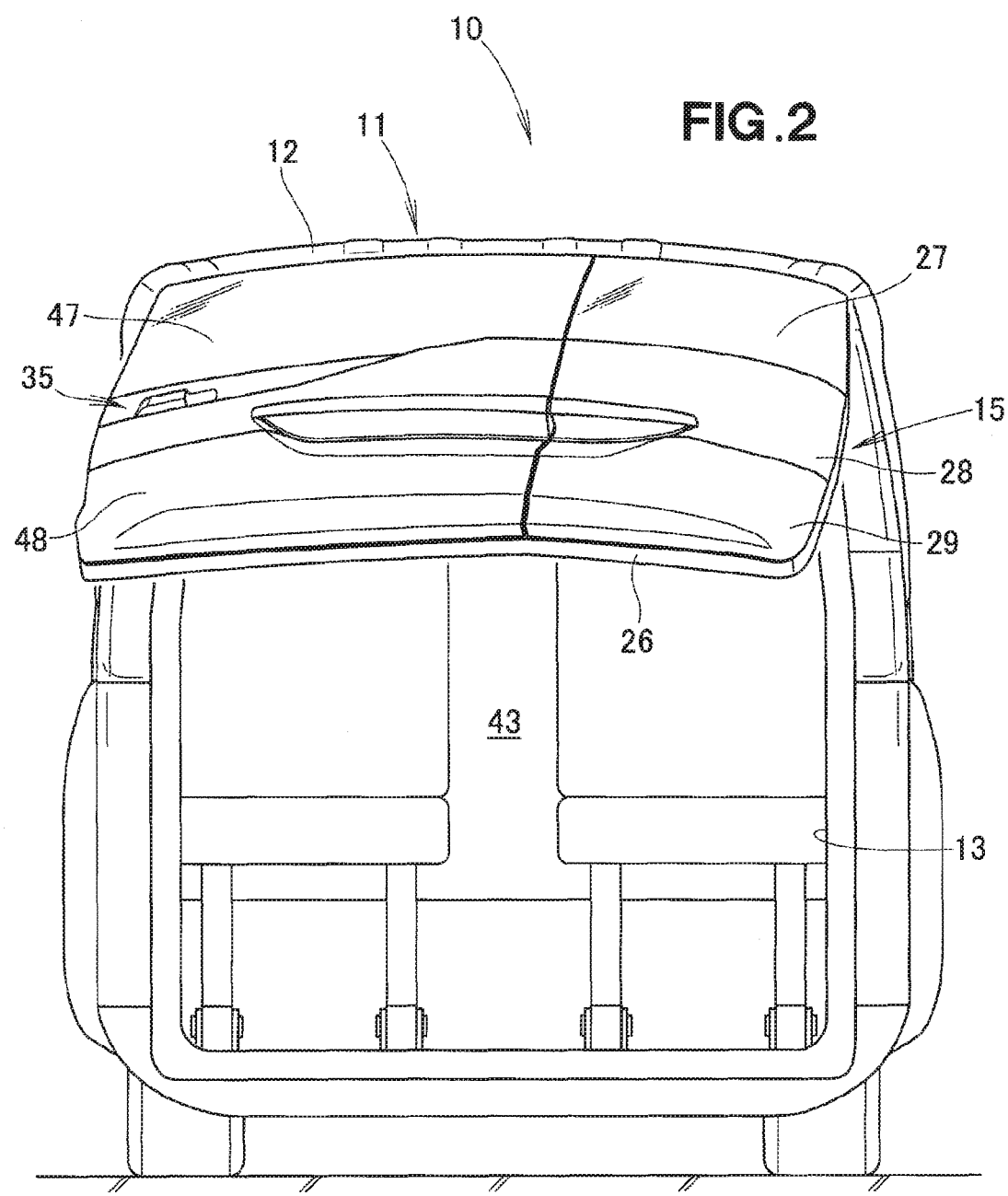
FIG. 2 is a rear elevational view illustrating in an opened state a tailgate of the vehicle body structure of FIG. 1.

As shown in FIGS. 1 and 2, a vehicle body structure 10 according to the present invention includes at a rear part 12 of a vehicle body 11 a tailgate opening 13, a plurality of tailgate hinges 14 arranged horizontally at the rear part 12 of the vehicle body 11, and a tailgate 15 pivotable about the tailgate hinges for opening and closing the tailgate opening 13. Hereinafter, the rear part 12 of the vehicle body 11 will be referred to as the "vehicle boy rear part 12".

The vehicle body rear art 12 has a left side panel 17 forming a left outer surface of the vehicle body rear part 12, a right side panel 18 forming a right outer side of the vehicle body rear part 12, and a roof part 19 disposed between an upper end part 17a (see also FIG. 3) of the left side panel 17 and an upper end part of the right side panel 18.

Figure 3:
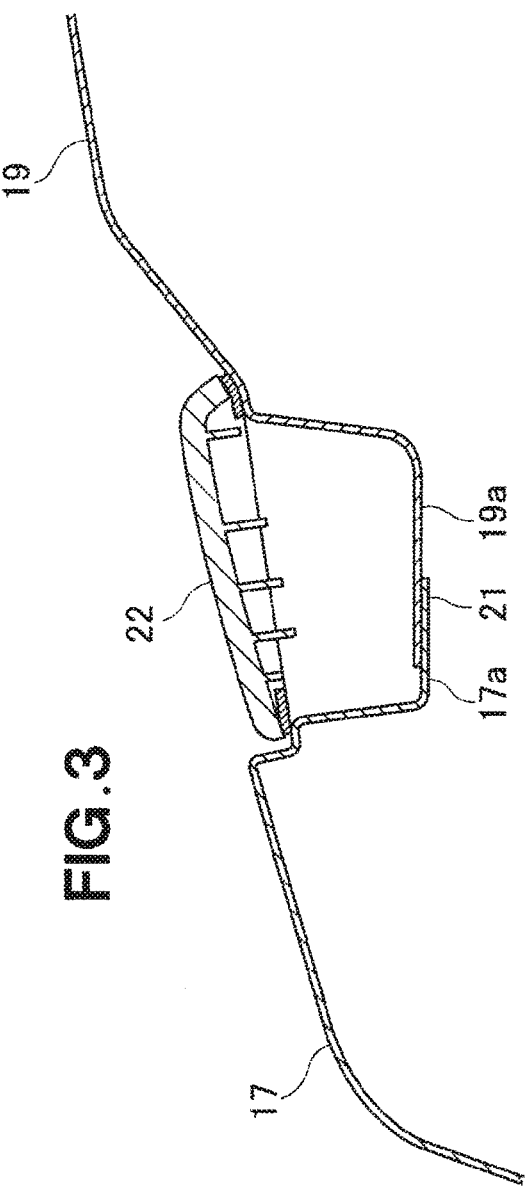
FIG. 3 is a cross-sectional view taken along line 3-3 of FIG. 1.

As shown in FIG. 1 and 3, the upper end part 17a of the left side panel 17 is joined to a left end part 19a of the roof part 19 so as to provide a left joining part 21 which is U-shaped in cross-section. Since the left joining part 21 extends in a vehicle length direction, its rear end part 21a extends from a vehicle front side as far as the vicinity of the tailgate 15 (more specifically, its upper part). An opening of the left joining part 21 is covered by a left cover 22 from above.

Upper end part of the right side panel 18 and right end part of the roof part 19 are joined together so as to form the right joining part 23 into a U-shaped cross-section. Opening of the right joining part is covered by a right cover 24 from above. The left joining part 21 and the right joining part 23 are formed generally symmetrically. Hence, description will be made as to the left joining part 21 only, omitting description as to the right joining part 23.

Figure 4:
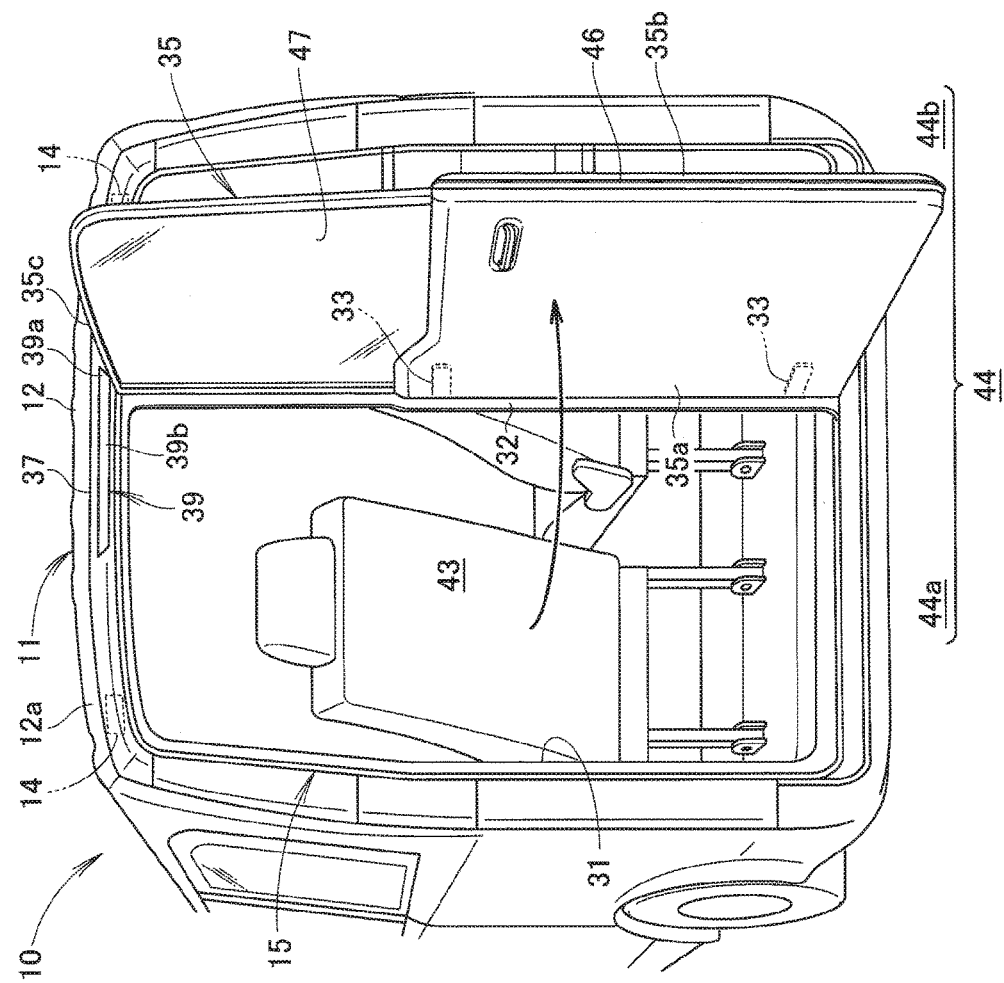
FIG. 4 is a rear view illustrating in an opened state a sub-door of the vehicle body structure of FIG. 1.

Referring now to FIG. 4 in conjunction with FIG. 1, the tailgate 15 includes a tailgate body 26 supported vertically pivotally via the plural tailgate hinges 14 at an upper part 12a of the vehicle body rear part 12, a tailgate window glass pane 27 provided to the tailgate body 26, an upper tailgate outer surface member 28 disposed below the tailgate window glass pane 27, and a lower tailgate outer surface member 29 provided below the upper tailgate outer surface member 28.

The tailgate 15 includes a door opening 31 formed in the tailgate body 26 at a position leftward of the tailgate window glass pane 27, the upper tailgate outer surface member 28 and the lower tailgate outer surface member 29, upper and lower door hinges 33 provided to a right side part 32 of the door opening 31, a sub-door 35 having a right edge 35a disposed on the upper and lower door hinges 33, a design member (spoiler) 37 provided to the tailgate body 26, and a high-mount stop lamp (lighting device) 39 and a washer nozzle 41 (see also FIG. 7) both provided to the design member 37.

As shown in FIG. 2, the tailgate opening 13 is opened as the tailgate 15 is opened upward and positioned horizontally. As the tailgate opening 13 is opened, a vehicle interior 43 and a vehicle exterior 44 communicates with each other, whereby getting-in and getting-off of as passenger and loading and unloading of luggage are permitted. As the tailgate 15 is downwardly closed, the tailgate 15 positioned substantially vertically. In this state, the tailgate opening 13 is closed by the tailgate 15.

As shown in FIG. 4, the sub-door 35 has right and left side edges 35a, 35b, one (right side edge 35a) of which is pivotally supported by the right side part 32 of the tailgate body 26 (namely, the door opening 31) via the upper and lower door hinges 33. Thus, the sub-door 35 can be opened by moving or pulling an opposite or left side edge 35b relative to the tailgate body 26.

Stated otherwise, the door opening 31 opened and closed by pivotally horizontally moving the sub-door 35 about the upper and lower door hinges 33. The sub-door 35 includes a door body 46 supported by the right side part 32 of the tailgate body 26 pivotally about the upper and lower door hinges 33, a door window glass pane 47 disposed at an upper part of the door body 46, and a door outer surface member 48 (see FIG. 1) provided below the door window glass pane 47.

Figure 5:
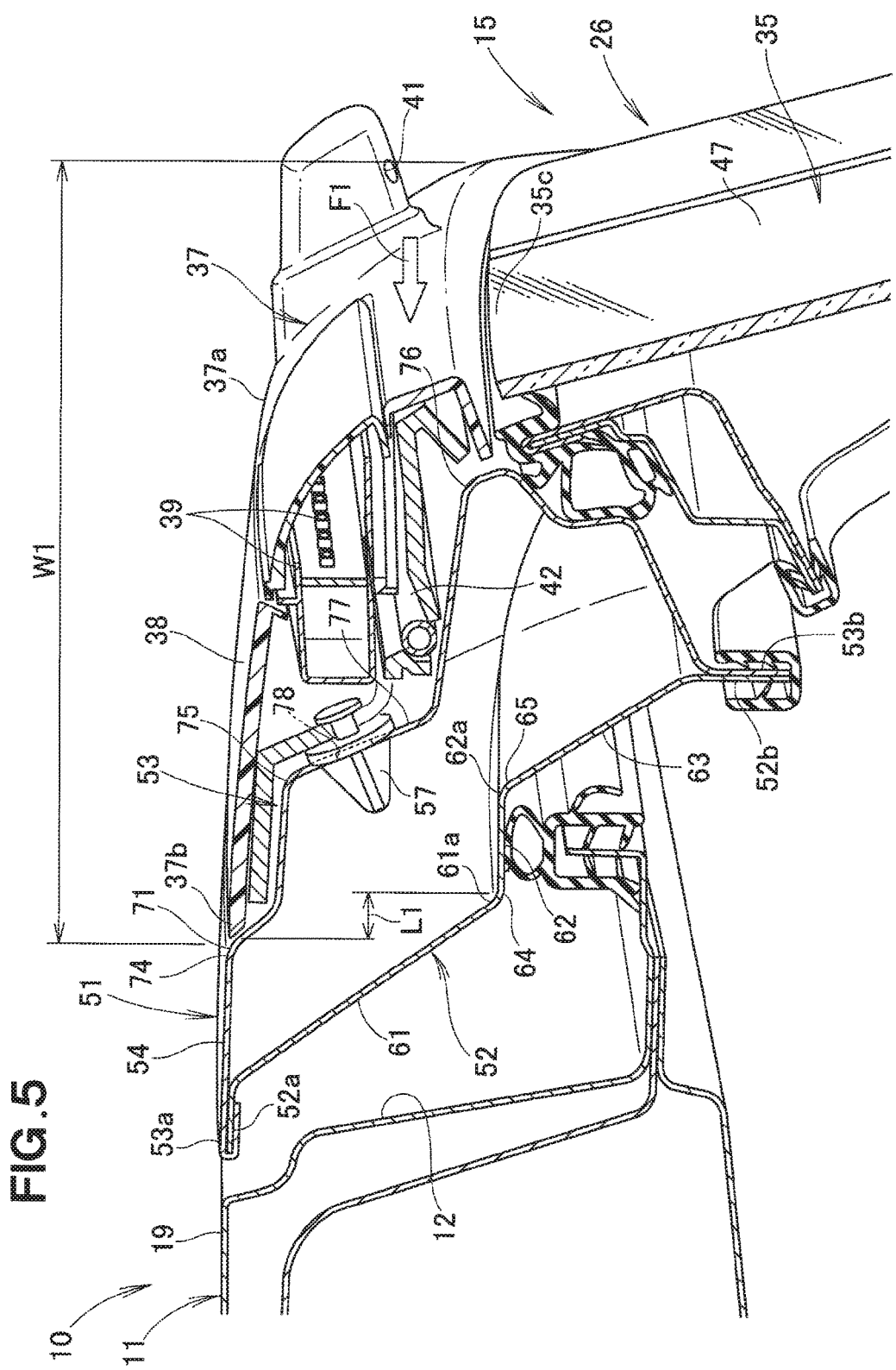
FIG. 5 is a partially broken perspective view taken along line 5-5 of FIG. 1.

As shown in FIG. 5, the tailgate body 26 has a tailgate upper part 51 forming an upper part thereof. The tailgate upper part 51 includes a front panel 52 provided rearwardly of the vehicle body rear part 12 and a rear panel 53 provided rearwardly of the vehicle body rear part 12. An upper end part 52a of the front panel 52 and an upper end part 53a of the rear panel 53 are caulked in a hemming process while a lower end part 52b of the front panel 52 and a lower end part 53b of the rear panel 53 are joined together.

The tailgate upper part 51 is formed into a closed cross section by the front panel 52 and the rear panel 53. The tailgate upper part 51 of closed cross section extends in a vehicle width direction. Provided rearwardly of the rear panel 53 of the tailgate upper part 51 is a design member 37 separate from the tailgate upper part 51. A high-mount stop lamp 39 and a washer nozzle 41 are provided to the design member 37.

In this arrangement, when a load F1 is applied to the vehicle body rear part 12 from behind, the design member 37 absorbs the applied force F1 to thereby suppress deformation of the tailgate upper part 51 (and hence the tailgate body 26). Thus, only the design member 37 damaged by the applied force F1 may be repaired or changed. In other words, it is not necessary to repair the tailgate body 26, whereby work efficiency for repair can be increased.

The high-mount stop lamp 39 is provided to the design member 37. Thus, it is not necessary to cause an electrical wire such as a wire harness 55 (see FIG. 9) connected to the high-mount stop lamp 39 to pass through the sub-door 35 before connection to the high-mount stop lamp 39. Thus, the electrical wire can be disposed to run from the tailgate body 26 (specifically, tailgate upper part 51) directly to the high-mount stop lamp 39. This makes it unnecessary for the sub-door 35 to he formed to allow passage of the wire harness 55 therethrough, whereby the sub-door 35 can be rendered simple in construction.

Further, provision of the high-mount stop lamp 39 to the design member 37 prevents the high-mount stop lamp 39 from moving together with the sub-door 35 upon opening of the sub-door 35. Consequently, even when the sub-door 35 is opened, the high-mount stop lamp 39 can be viewed from behind the vehicle body.

Upper end part of the 37a of the design member 37 (or upper end part of the tailgate 15) is positioned upwardly of the upper end 35c of the sub-door 35. The high-mount stop lamp 39 is disposed at a vertically intermediate position between the upper end 37a of the design member 37 and the upper end 35c of the sub-door 35 in such a manner as to avoid the sub-door 35.

Thus, as can be appreciated from FIG. 4, when the sub-door is opened, the high-mount stop lamp 39 is not hidden by the sub-door upon opening of the irrespective of the degree of opening of the sub-door 35. Consequently, the high-mount stop lamp 39 can be seen from behind the vehicle body even when the sub-door 35 is opened.

With the high-mount stop lamp 39 disposed between the upper end 37a of the design member 37 and the upper end 35c of the sub-door, positioning of the high-mount stop lamp 39 at a relatively high position is enabled. Thus, at the vehicle exterior 44, even when a passenger is present standing in the vicinity of the door opening 31, the high-mount stop lamp 39 is positioned upward of the passenger. Consequently, there is no fear of the high-mount stop lamp 39 being hidden by the passenger, thus visibility of the high-mount stop lamp 39 is ensured.

Figure 6:
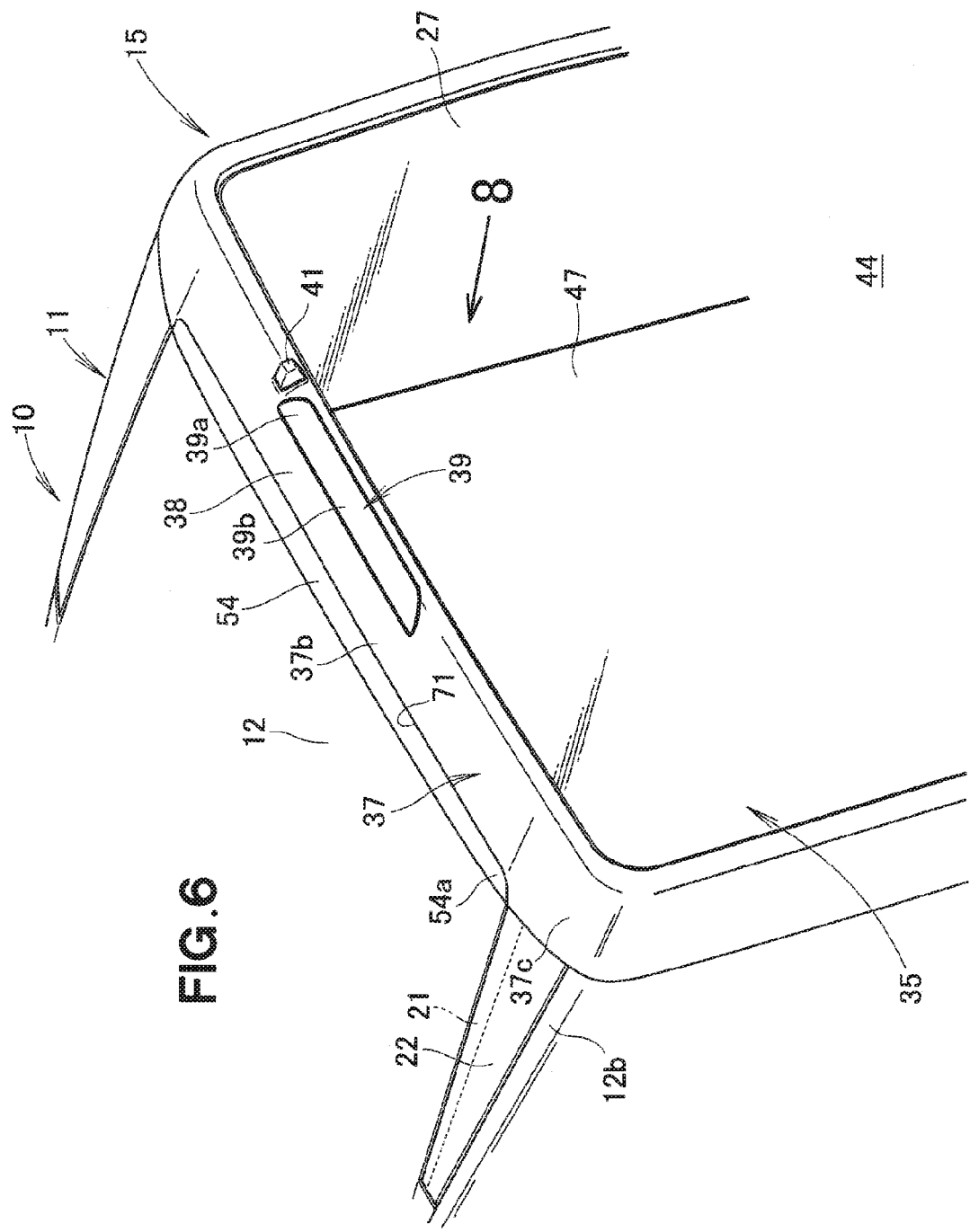
FIG. 6 is a perspective view illustrating a vehicle body rear part and the tailgate of FIG. 1.
Figure 7:
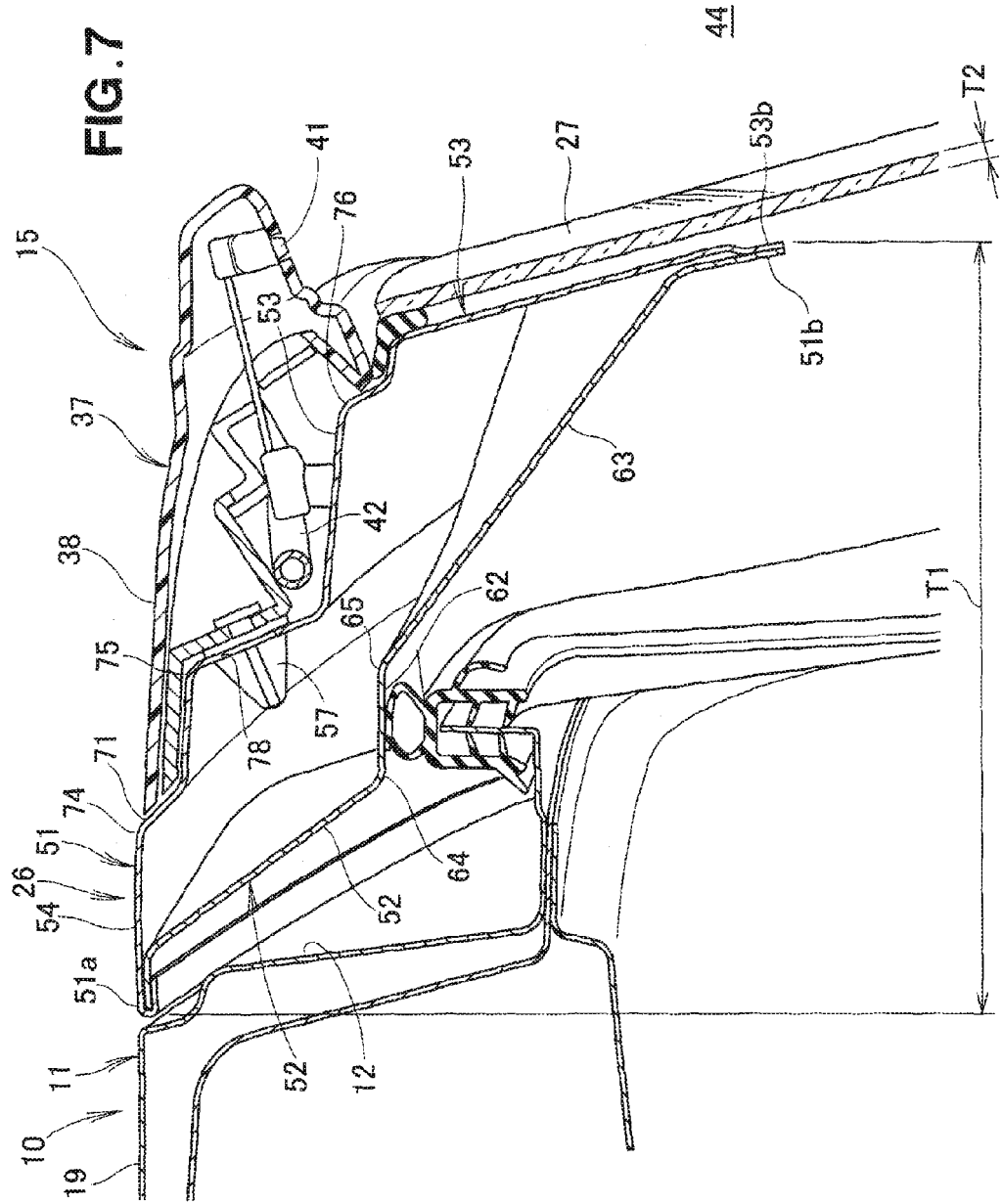
FIG. 7 is a partially broken, perspective view taken along line 7-7 of FIG. 1.

As shown in FIGS. 6 and 7, the washer nozzle 41 is disposed at that part of the design member 37 which is in the vicinity of the laterally right side of the right end part 39a of the high-mount stop lamp 39. The washer nozzle 41 is configured to spray a washing liquid onto the door window glass pane 47 of the sub-door 34 and onto the tailgate window glass pane 27 of the tailgate 15.

Provision of the washer nozzle 41 on the design member 37 (namely, the tailgate 15) makes it unnecessary for a tube 42 for feeding the washing liquid to the washer nozzle 41 to pass through the sub-door 35. As a result, the sub-door 35 is rendered simple in construction.

Figure 8:
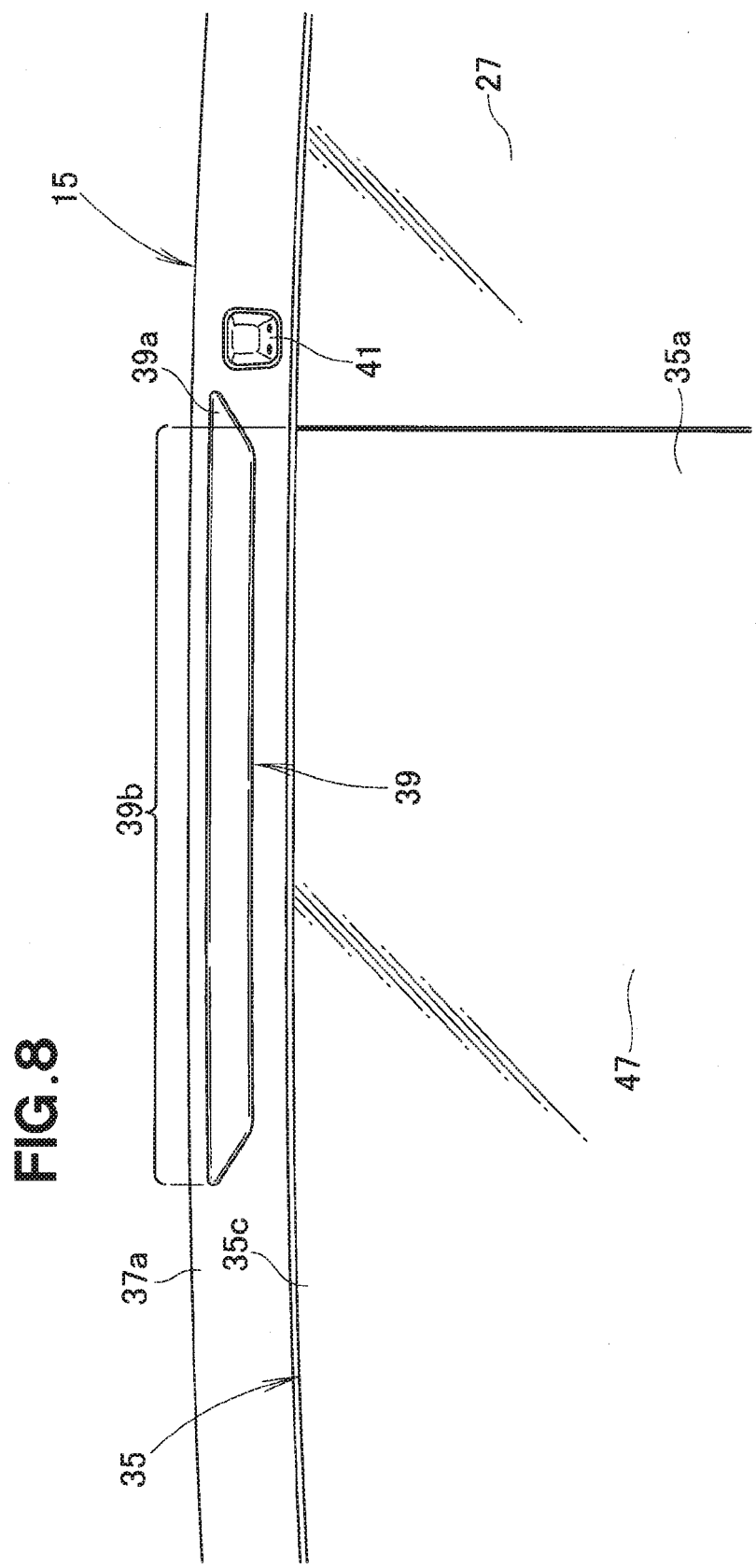
FIG. 8 is a view taken in the direction of arrow 8 of FIG. 6.

As shown in FIGS. 4 and 8, the sub-door 35 is disposed such that the right side edge 35a of the sub-door 35 overlaps with a major part 39b of the high-mount stop lamp 39 in a vehicle width direction. The sub-door 35 has the right side edge 35a which is pivotally supported by the right side part 32 of the tailgate body 26 via the upper and lower door hinges 33.

Thus, in the state of the sub-door 35 being opened, it is possible to cause the major part 39b of the high-mount stop lamp 39 to confront that region 44a of the vehicle exterior 44 which is on the left side of the sub-door 35 and to cause the right end part 39a of the high-mount stop lamp 39 to confront a right side region 44b of the vehicle exterior 44. In other words, it becomes possible not to hide the high-mount stop lamp 39 entirely with the sub-door 35 opened.

Thus, the major part 39b and the right end part 39a of the high-mount stop lamp 39 can be seen when a passenger shorter than the height of the high-mount stop lamp 39, for example, is present in either of the left side region 44a and the right side region 44b. Consequently, desired visibility of the high-mount stop lamp 39 can be maintained.

Assume that the high-mount stop lamp 39 is provided to the sub-door 35, the right side edge 35a of the sub-door 35 and the high-mount stop lamp 39 overlap with each other, thus requiring the high-mount stop lamp 35 to be divided at the right side edge 35a. The high-mount stop lamp 39 has thus come to be disposed on the tailgate 15. This negates the necessity to divide the high-mount stop lamp 39 and renders the high-mount stop lamp 39 simple in construction and allows horizontal disposition of the stop lamp 39 at a desired position, whereby freedom of design is increased.

As shown in FIGS. 6 and 7, the sub-door 35 has the door window glass pane 47 on the side of the vehicle exterior 44 while the tailgate 15 has on the side of the vehicle exterior 44 the tailgate window glass pane 27. The tailgate window pane 27 is disposed on the right side of the door window glass pane 47 avoiding the sub-door 35. The door window glass pane 47 and the tailgate window glass pane 27 are disposed such that their outer surfaces become flush with each other.

In light of the external aesthetic appearance and visibility of the vehicle body 11, it is desirable that the outer surface of the tailgate 15 be laid flush with the outer surface of the sub-door 35. However, to make the outer surface of the tailgate 15 lie flush with the outer surface of the sub-door 15, it is necessary to prolong the distance between a front end part 51a and a rear end part 51b of the tailgate body 26 (specifically; a tailgate upper part 51) (namely, a thickness dimension T1 of the tailgate 15). Thus, the amount of draw of the front panel 52 and the rear panel 53 of the tailgate upper part 51 upon draw-forming of the frames of the tailgate upper part 51 becomes large, whereby forming of the front panel 52 and the rear panel 53 becomes difficult.

Thus, the tailgate window glass pane 27 is provided on that side of the tailgate 15 which faces the vehicle exterior 44 and is arranged to lie flush with the door window glass pane 47. As a result, the amount of draw of the front panel 52 and the rear panel 53 can be kept smaller by a thickness dimension T2 of the tailgate window glass pane 27, whereby the front panel 52 and the rear panel 53 (and hence the tailgate body 26) is rendered easy to form.

Turning back to FIG. 5, the tailgate upper part 51 of the tailgate body 26 is provided at the vehicle body rear part 12. More specifically the tailgate upper part 51 pivotally supported at the vehicle body rear part 12 via the hinges 14 (see FIG. 1). In a state of the tailgate 15 being closed, the front panel 52 of the tailgate upper part 51 is opposed direct to the vehicle body rear part 12.

The design member 37, which is independent of the tailgate upper part 51, is mounted via clips 57 to the rear panel 53 of the tailgate upper part 52 on the vehicle body rear side. In this state, the roof part 19 forming the upper outer surface of the vehicle body 11, a tailgate surface part 54 forming the upper outer surface of the tailgate upper part 51 and a design surface part 38 forming upper outer surface of the design member 37 are arranged to lie flush with each other.

The tailgate surface part 54 is positioned on the roof part 19 rearward of the vehicle body while the design surface part 38 is positioned on the tailgate surface 54 rear ward of the vehicle body. The design surface part 38 is positioned above the rear panel 53 of the tailgate upper part 51. In this manner, the design member 37 is mounted to the rea panel 53 of the tailgate upper part 51 while the front panel 52 of the tailgate upper part 51 is opposed direct to the vehicle body rear part 12, whereby the configuration of the closed cross section can be kept large.

Figure 9:
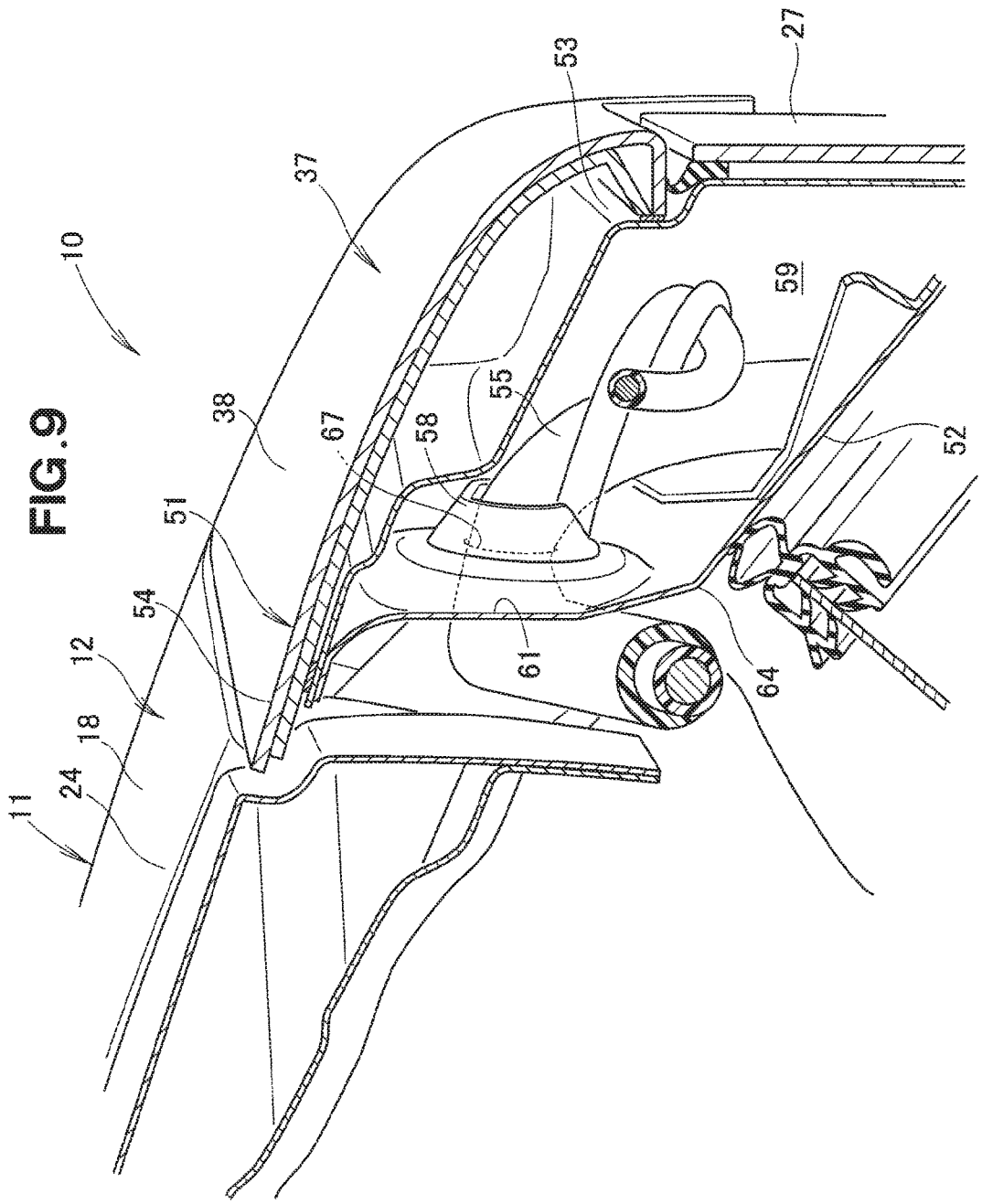
FIG. 9 is a partially broken, perspective view taken along line 8-8 of FIGS. 1.

As a result, an area for mounting a grommet 58 to the tailgate upper part 51 is provided, as shown in FIG. 9. A linear member (electrical wire) such as the wire harness 55 is passed through the grommet 58. With the configuration of the closed cross section of the tailgate upper part 51 made large, a routing space 59 for the wire harness 55 can be provided appropriately within the closed cross section.

As shown in FIG. 5, the design member 37 is secured to the rear panel 53 of the tailgate upper part 51 by means of clips 57. Thus, the tailgate upper part 51 is covered by the design member 37 from behind the vehicle body. As a result, the tailgate upper part 51 is hidden by the design member 37 so that the tailgate upper part 51 cannot be seen from behind the vehicle body, thus imparting an improved design feature to the vehicle bod (particularly to the vehicle body rear part 12).

The front panel 52 of the tailgate upper part 51 includes a first surface 61 extending vertically, a second surface 62 extending rearward from a lower end 61a of the first surface 61, and a third surface 63 extending downward from a rear end 62a of the second surface. The upper end part (namely the upper end part 52a of the front panel 52) of the first surface 61 is joined with the upper end part 53a of the rear panel 53. The lower end part (namely, the lower end part 52b of the front panel 52) is joined with the lower end part 53b of the rear panel 53.

A first ridge line 64 is formed at the intersection of the first and second surfaces 61, 62 while a second ridge line 65 is formed at the intersection of the second and third surfaces 62, 63. A through-hoke 67 (see FIG. 9) is formed in the first surface 61.

As shown in FIG. 9, the grommet 58 is mounted to the through-hole 67 and the wire harness 55 extending from the vehicle body 11 is passed through the grommet 58.

The through-hole 67 is formed only in the first surface 61. By forming the through-hole 67 in the first surface 61 only, it becomes possible to prevent rupture of the first ridge line 64 with the through-hole 67. Thus, the tailgate upper part 51 of the front panel 52 can he reinforced by the first ridge line 64 and the second ridge line 65 (see FIG. 5). As a result, with the rigidity of the front panel 52 of the tailgate upper part 51 (and hence the tailgate 15) maintained, the through-hole 67 is formed for passage of the wire harness 55 through the tailgate upper part 51. Further, by forming the through-hole 67 in only the flat first surface 61, without forming the through-hole 67 in the first ridge line 64, the front panel 52 of the tailgate upper part 51 can be formed without difficulty.

Note also that as shown in FIG. 5, the front end part 37b of the design member 37 (more specifically the front end part of the design surface part 38) is positioned a distance L1 further than the first ridge line 64 toward the vehicle body front side. The front end part 37b of the design member 37 can thus be positioned on the vehicle body front side. This renders a boundary 71 between the front end part 37b of the design member 37 and the tailgate surface part 54 difficult to be seen from behind the vehicle body, whereby the aesthetic appearance of the vehicle body rear part 12 is improved.

Further, the design width dimension W1 in the vehicle front-rear direction can he secured largely for the design member 37, thereby increasing the rigidity in the vehicle body front-rear direction of the design member 37.

In addition, of the tailgate upper part 51, part of the tailgate surface part 54 on the vehicle body rear side is formed to take a roundabout path to lie under the design member 37. The part following the roundabout path takes a stepped from to thereby further increase the rigidity of the tailgate upper part 51.

By virtue of the vehicle-body-rear side part of the tailgate surface part 54 of the tailgate upper part 51 configured to follow the roundabout path to lie under the design member 37, the closed cross-section formed by the tailgate upper part 51 is formed largely so as to run round and lie under the design member 37, as shown in FIG. 9. Consequently, the wire harness 55 passed through the through-hole 67 into the closed cross-section of the tailgate upper part 51 is allowed to run under the design member 37 and to gently bend to extend in a vehicle width direction. This assists in keeping a load applied to the wire harness 55 to a minimum compared to the case wherein the wire harness 55 is bent sharply in the vehicle width direction, Turning back to FIG. 5, the rear panel 53 of the tailgate upper part 51 is bent into a substantially serrated form having three stepped parts, namely, an upper stepped part 74, to middle stepped part 75 and a lower stepped part 76. The upper stepped part 74 is positioned on the side of the design surface part 38 while the middle stepped part 15 is positioned below the upper stepped part 74. The lower stepped part 76 is positioned below the middle stepped part 75. That is, the middle stepped part 75 is positioned at the center between the upper and lower stepped parts 74, 76.

The upper stepped part 74, the middle stepped part 75 and the lower stepped part 76 are imparted with high rigidity and extend in the vehicle width direction. The upper stepped part 74, the middle stepped part 75 and the lower stepped part 76 jointly reinforce the rear panel 53 of and hence the tailgate upper part 51 and impart rigidity to the latter.

The middle stepped part 75 has a planar surface 77 into which a mounting aperture or part (see also FIG. 7) is formed. The design member 37 is mounted to the mounting aperture 78 via the clips 57. The design member 37 is thus mounted to the middle stepped part 75 having high rigidity. In other words, the design member 37 is mounted to the middle stepped part 75 firmly with increased rigidity.

Since the middle stepped part 75 is disposed between the upper stepped part 74 and the lower stepped part 76, the middle stepped part 75 is imparted with rigidity higher than those of the upper and lower stepped parts 74, 76. This provides increased positional precision to the mounting aperture 78, whereby the mounting precision for the design member 37 is enhanced.

As shown in FIGS. 6 and 10, the left joining part 21 (see FIG. 3) is disposed on a left upper side part 12b of the vehicle body rear part 12. A vehicle widthwise end 54a of the tailgate surface part 54 is disposed laterally of the vehicle from the vehicle interior 43 so as to be contiguous with the left joining part 21. A left end part 37c of the design member 37 protrudes laterally outward of the vehicle body beyond the left end part 54a of the tailgate surface part 54. The boundary 71 (see also FIG. 5) between the tailgate surface part 54 and the design member 37 continues with the left joining part 21, with the result that rain and wind flowing rearward past the left joining part 21 and its vicinity is guided to the boundary 71, thereby doing away with a fear of the rain and wind piling up at the left joining part 21 and its vicinity.

With the left end part 370 of the design member 37 disposed to protrude laterally outwardly beyond the left end part 54a of the tailgate surface part 54, the left end part 54a of the tailgate surface part 54 can be hidden by the left end part 37c of the design member 37. As a result, the boundary 71 between the left end part 54a of the tailgate surface part 54 and the design member 37 is rendered invisible from the vehicle exterior 44 whereby the external appearance of the vehicle body rear part 12 is improved. Further, since the left joining part 21, the left cover 22 covering the left joining part 21 and the left end part. 54a of the tailgate surface part 54 look continuous as they are viewed from an upper level of the vehicle exterior 44, the external appearance of the vehicle body rear part 12 is improved. In addition, the left:

joining part 21 is spaced or offset a space SI from the grommet 58 or the through-hole 67 (see FIG. 9) in the vehicle width direction.

The tailgate hinges 14 (see FIG. 1) of the tailgate 15 and a member such as a stay (not shown) for supporting the tailgate 15 are provided on the side of the rear end part 21a of the left joining part 21. Thus, it is likely that the wire harness 55 passed through the grommet 58 will interfere with such members as the tailgate hinges 14 and the stay. To this end, the left joining part 21 is disposed with the space S1 left relative to the grommet 58 so that interference of the wire harness 55 with the tailgate hinges 14 and the stay can be prevented.

It should be noted that the vehicle body structure according to the present invention should not be construed as being limited to the embodiment described above and alterations are possible as necessary. For example, the configurations and constitutions of the vehicle body vehicle body rear part, tailgate opening, tailgate, tailgate body, tailgate window glass pane, door opening, sub-door, design member, high-mount stop lamp, washer nozzle and the door window glass pane are not limited to those explained above but changes and modifications of the same can be made as necessary.

The present invention are particularly suitable for use on an automobile having an opening formed in a rear part of the automobile and a tailgate supported at the rear part for opening and closing the opening.

The invention claimed is:

1. A vehicle body structure having an opening formed in a vehicle body rear part and a tailgate supported by the vehicle body rear part for opening/closing the opening,
    wherein the tailgate comprises:
    a tailgate body supported by the vehicle body rear part;
    a door opening formed in the tailgate body;
    a sub-door supported by the tailgate body for opening/closing the door opening; and
    a lighting device disposed to avoid the sub-door,
    wherein the sub-door has right and left side edges, one side edge of the right and left side edges is pivotally supported by supporting members of the tailgate body formed in the vehicle body rear part, and
    the lighting device is disposed in a vehicle width direction so as to cross the one side edge at which the sub-door is supported by the supporting members.

2. The vehicle body structure of claim 1, wherein the tailgate has an upper end positioned above an upper end of the sub-door, and the lighting device is disposed vertically between the upper end of the tailgate and the upper end of the sub-door.

3. The vehicle body structure of claim 1, wherein a spoiler separated from the tailgate is provided on the vehicle body rear part rearward of the tailgate.

4. The vehicle body structure of claim 1, wherein the tailgate is provided with the sub-door and a washer nozzle for spraying a washing liquid onto the tailgate.

5. The vehicle body structure of claim 1, further comprising:
    a first window glass pane provided on a vehicle exterior side of the sub-door, and a second window glass pane provided on that part of a vehicle exterior side of the tailgate which avoid the sub-door,
    wherein the first window glass pane and the second window glass pane are disposed to be flush with each other.

* * * * *